(12) United States Patent
Rajaie

(10) Patent No.: US 12,314,453 B2
(45) Date of Patent: *May 27, 2025

(54) WIPING SERVICE CENTER MECHANISM FOR A REMOTELY CONDUCTED PROCESSING AND ONSITE VERIFICATION OF DATA BEARING ENDPOINT DEVICES

(71) Applicant: Sepehr Rajaie, Pataskala, OH (US)

(72) Inventor: Sepehr Rajaie, Pataskala, OH (US)

( * ) Notice: Subject to any disclaimer, the term of this patent is extended or adjusted under 35 U.S.C. 154(b) by 386 days.

This patent is subject to a terminal disclaimer.

(21) Appl. No.: 17/733,354

(22) Filed: Apr. 29, 2022

(65) Prior Publication Data

US 2023/0351058 A1 Nov. 2, 2023

(51) Int. Cl.
*G06F 21/78* (2013.01)
*G06F 21/86* (2013.01)
*G06K 19/07* (2006.01)

(52) U.S. Cl.
CPC .............. *G06F 21/78* (2013.01); *G06F 21/86* (2013.01); *G06K 19/0723* (2013.01); *G06F 2221/2143* (2013.01)

(58) Field of Classification Search
CPC .. G06F 21/78; G06F 21/86; G06F 2221/2143; G06K 19/0723
USPC ........................................................... 726/26
See application file for complete search history.

(56) References Cited

U.S. PATENT DOCUMENTS 10,675,635 B1 * 6/2020 Drexler ................... B02C 25/00
10,831,388 B2 * 11/2020 Sasson .................. G06F 3/0617

* cited by examiner

*Primary Examiner* — Benjamin A Kaplan
(74) *Attorney, Agent, or Firm* — Furr Law Firm; Jeffrey M. Furr

(57) ABSTRACT

A Wiping Service Center Mechanism for remotely conducted processing and onsite verification of data bearing endpoint devices. This Wiping Service Center Mechanism provides onsite tagging, scanning, and tracking with a unique RFID or active identification tag using a secure and proprietary database, processing conducted by remote sanitizer to wipe current data on data bearing endpoint devices using a designated wiping system with requested number of data wiping passes and reset to factory settings based on post-processing intent, and securing the onsite containment of processed devices until verification by onsite verifier.

20 Claims, 1 Drawing Sheet

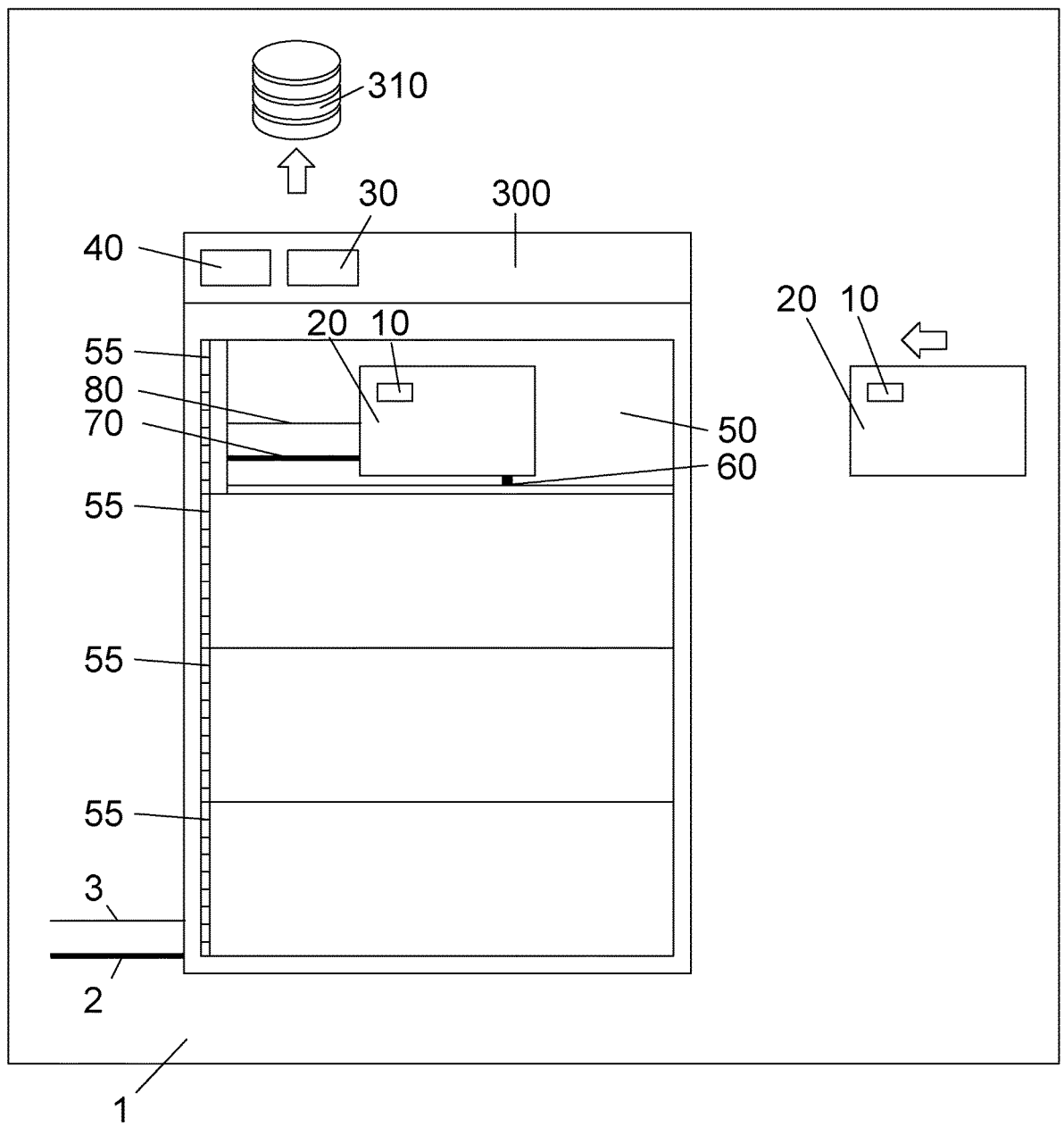

WIPING SERVICE CENTER MECHANISM FOR A REMOTELY CONDUCTED PROCESSING AND ONSITE VERIFICATION OF DATA BEARING ENDPOINT DEVICES

CROSS-REFERENCES TO RELATED APPLICATIONS (IF ANY)

Not Applicable

BACKGROUND

1. Field of the Invention

The present invention relates to a device and system for a Wiping Service Center Mechanism for a Remotely Conducted Processing and Onsite Verification of Data Bearing Endpoint Devices.

2. Description of Prior Art

Data bearing endpoint devices that are scheduled for re-use, refurbishment, or retirement need to have the current data wiped and the device reset to factory settings as indicated based on post-processing intent. This process must be verified to meet cyber security framework regulations when the device is removed from containment.

Other systems may not provide processing for data bearing endpoint devices that are scheduled for reuse, refurbishment, or retirement. Other systems may not perform onsite tagging for data bearing endpoint devices with a unique RFID or active identification tag. Other systems may not enter the identifying information and unique RFID or active identification tag information into a secure and proprietary database. Other systems may not enter post-processing intent for each data bearing endpoint device into a secure and proprietary database. Other systems may not scan and track data bearing endpoint devices during the data Wiping process. Other systems may not connect and insert the data bearing endpoint device into a secured Wiping Service Center Mechanism. Other systems may not have processing conducted by a remote sanitizer. Other systems may not wipe the current data using the designated wiping system with as many data wiping passes as requested. Other systems may not reset to the factory settings on data bearing endpoint devices. Other systems may not reset to factory settings based on post-processing intent. Other systems may not provide secure onsite containment of the processed devices until verification by an onsite verifier. Other systems may not provide verification to meet cyber security regulations. Other systems may not be used within the client's secure location. Other systems may not process devices with no threat of loss of assets. Other systems may not perform the wiping and reset process for data bearing endpoint devices in a time and resource saving manner. Other systems may not be changeable based on changes in the characteristics of data bearing endpoint devices. Other systems may not be changeable based on changes in the cyber security framework regulations for data wiping.

There is still room for improvement in the art.

SUMMARY OF THE INVENTION

The present invention is a Wiping Service Center Mechanism and System that provides remotely conducted processing and onsite verification to meet cyber security framework regulations for data bearing endpoint devices that are scheduled for re-use, refurbishment, or retirement. It works by onsite tagging them with a unique RFID or active identification tag, entering the identifying information and unique RFID or active identification tag information and post-processing intent for each data bearing endpoint device into a secure and proprietary database. Scanning and tracking with a unique RFID or active identification tag using a secure and proprietary database. Connecting and inserting the tagged data bearing endpoint device into the secured Wiping Service Center Mechanism. Wiping processing conducted by a remote controlled sanitizer to wipe current data on data bearing endpoint devices using the designated wiping system with as many data wiping passes as requested. Resetting the data bearing endpoint device to the factory settings. Secure onsite containment of the processed devices until verification by onsite verifier.

The Wiping Service Center Mechanism and System is intended for use within the customer's secure office or enterprise facility with no threat of loss of assets. The Wiping Service Center Mechanism can be produced to process devices in a time and resource efficient manner without interfering with business operations. The components of the Wiping Service Center Mechanism are modular and can be changed based on changes in the characteristics of data bearing endpoint devices and changes in the cyber security framework regulations for data wiping.

It is more efficient, effective, accurate and functional than the current art.

BRIEF DESCRIPTION OF THE DRAWINGS

Without restricting the full scope of this invention, the preferred form of this invention is illustrated in the following drawings:

FIG. 1 shows a diagram of some of the components of the invention.

DESCRIPTION OF THE PREFERRED EMBODIMENT

There are a number of significant design features and improvements incorporated within the invention.

As shown in FIG. 1, the present invention is a device and system for wiping current data on data bearing endpoint devices 20.

Data bearing endpoint devices 20 that are scheduled for re-use, refurbishment, or retirement need to have the current data wiped and the device reset to factory settings as indicated based on post-processing intent.

Wiping is defined in the industry as a data destruction process that overwrites data on magnetic and solid state data bearing devices. Under industry regulations, overwriting data, wiping, is a data destruction process.

The current invention is a Wiping Service Center Mechanism 1 that provides remotely conducted processing and onsite verification to meet cyber security framework regulations for data bearing endpoint devices 20 that are scheduled for reuse, refurbishment, or retirement by onsite tagging them with a unique Radio Frequency Identification ("RFID") or bar codes or PID or active identification tag 10. The identifying information and unique RFID or active identification tag 10 information and post-processing intent for each data bearing endpoint device is entered into a secure and proprietary database 310 located on non-transitory memory.

The mechanism 1 uses a scanner 30 to scan and track the unique RFID or active identification tag 10 using the secure and proprietary database 310, uses a keypad release door mechanism 40 to open the appropriate compartment door 55 based on the size and type of the scanned data bearing endpoint device by the onsite verifier.

Connection of power cable 70, server connection cable 80, and antitheft wire 60 located in the compartment 50 to the scanned data bearing endpoint device 20 by the onsite verifier, inserting the scanned data bearing endpoint device 20 into the secured compartment 50, close the compartment door 55 and secure the keypad release door mechanism lock. Mechanism 1 processing conducted by a remote controlled sanitizer to Wipe current data on data bearing endpoint devices 20 using the designated wiping system 300 with as many data wiping passes as requested and reset the data bearing endpoint devices 20 to the factory settings as indicated based on post-processing intent. The data bearing endpoint devices 20 are secured inside the secured mechanism 1 on site until verification by the onsite verifier. The remote controlled sanitizer can be control wirelessly in the preferred embodiment but other methods can be used.

The Mechanism 1 can have external power cable 2 and an external server connection cable 3 connecting to it.

The Mechanism 1 requires an organization which uses it to have external certification such as a formal Cyber Security Framework (CSF) that requires verification that the data bearing endpoint devices 20 that are scheduled for re-use, refurbishment, or retirement have the current data wiped and be reset to factory settings as indicated based on post-processing intent.

This Wiping Service Center Mechanism 1 requires the onsite verifier to use the keypad release door mechanism 40 to open the appropriate Wiping Service Center Mechanism compartment door 55 based on the size and type of the scanned data bearing endpoint device 20. The Wiping Service Center Mechanism 1 requires the onsite verifier to connect the power 70 and server 80 connection cables and antitheft wire 60 located in the Wiping Service Center Mechanism compartment 50 to the scanned data bearing endpoint device 20. The scanned data bearing endpoint device 20 is inserted into the Wiping Service Center Mechanism compartment 50 and the keypad release door mechanism lock is secured.

The data bearing endpoint devices 20 can be tagged and tracked with a unique RFID or active identification tag 10 using a secure and proprietary database 310 before they are scheduled for re-use, refurbishment, or retirement. The data bearing endpoint devices 20 that are scheduled for re-use, refurbishment, or retirement can be processed individually as soon as they are scheduled rather than waiting to process a large group at one time or waiting for a future date. The Wiping system 300 with as many data wiping passes as requested can be designated separately for each data bearing endpoint device 20 based on its configuration. The processed data bearing endpoint devices 20 can be securely contained onsite as long as needed until verification so that onsite verifier staffing can be performed efficiently. Data bearing endpoint devices 20 could be uniquely tagged, scanned, tracked, and securely contained without processing reducing the threat of loss whenever security for storing data bearing endpoint devices 20 is needed.

Steps:

Step 1 is the tagging of the data bearing endpoint device 20 that is scheduled for re-use, refurbishment, or retirement with a unique RFID or active identification tag 10 by an onsite verifier.

Step 2 is using the secure and proprietary database 310 for entering the identifying information and unique RFID or active identification tag information and post-processing intent for each data bearing endpoint device 20 by onsite verifier.

Step 3 is using the scanner 30 to scan and track the unique RFID or active identification tag 10 of each data bearing endpoint device 20 before inserting it into the Wiping Service Center Mechanism 1 by the onsite verifier.

Step 4 is using the keypad release door mechanism 40 to open the appropriate Wiping Service Center Mechanism compartment door 55 based on the size and type of the scanned data bearing endpoint device 20 by onsite verifier.

Step 5 is the connecting of power 70 and server connection cables 80 and antitheft wire 60 located in the Wiping Service Center Mechanism compartment 50 to the scanned data bearing endpoint device 20 by the onsite verifier.

Step 6 is inserting the scanned data bearing endpoint device 20 into the Wiping Service Center Mechanism compartment 50 and securing the keypad release door mechanism lock by the onsite verifier.

Step 7 is processing for wiping current data on secured data bearing endpoint device 20 using designated wiping system 300 with as many data wiping passes as requested and reset to the factory settings if indicated by post-processing intent conducted by the remote sanitizer.

Step 8 is containing the processed data bearing endpoint device 20 onsite inside the secured Wiping Service Center Mechanism 1 until verification by the onsite verifier.

Step 9 is using the keypad release door mechanism 40 to re-open the appropriate secured Wiping Service Center Mechanism compartment door 55 by the onsite verifier.

Step 10 is removing the processed data bearing endpoint device 20 from the Wiping Service Center Mechanism compartment 50 by onsite verifier.

Step 11 is disconnecting the power 70 and server connection cables 80 and antitheft wire 60 located in the Wiping Service Center Mechanism compartment 50 from the processed data bearing endpoint device 20 by the onsite verifier.

Step 12 is using the scanner 30 to scan the unique RFID or active identification tag 10 of the processed data bearing endpoint device 20 by the onsite verifier.

Step 13 is using the secure and proprietary database 310 for saving the identifying information and unique RFID or active identification tag information 10 scanned for each processed data bearing endpoint device 20 as verification by the onsite verifier.

Step 14 is re-use, refurbishment, or retirement of each processed data bearing endpoint device 20 as indicated by post-processing intent by the onsite verifier.

Advantages

This Wiping Service Center Mechanism is intended for use within the customer's secure office or enterprise facility with no threat of loss of assets. This Wiping Service Center Mechanism can be produced to process devices in a time and resource efficient manner without interfering with business operations. The components of this Wiping Service Center Mechanism are modular and can be changed based on changes in the characteristics of data bearing endpoint devices and changes in the cyber security framework regulations for data wiping.

It is a new method to process data bearing endpoint devices in a time and resource saving manner within the customer's secure office or enterprise facility with no threat of loss of assets.

CONCLUSION

Although the present invention has been described in considerable detail with reference to certain preferred versions thereof, other versions are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

That which is claimed is:

1. A device for destroying data on a data bearing endpoint device;
   a mechanism that receives data bearing endpoint devices, where the data bearing endpoint devices are tagged, has a scanner that scans the tag and stores the information in a database stored in non-transitory memory, has a plurality of compartments, placing the data bearing endpoint device into the proper compartment, having a wiping system that destroys the data by overwriting the data,
   resetting of the data bearing endpoint devices, and provides secure onsite containment of the processed devices until onsite verification.

2. The device according to claim 1 where the tags are unique identification tags.

3. The device according to claim 2 where the unique identification tags are unique radio frequency identification tags or bar codes or PID or active identification tags.

4. The device according to claim 1 where compartments has a plurality of doors based on the size and the type of data bearing endpoint device.

5. The device according to claim 4 where one or more compartments have a keypad release door mechanism, a power cable, server connection cable and antitheft wire.

6. The device according to claim 1 having a wiping system used by a remote controlled sanitizer.

7. The device according to claim 6 where the wiping system overwrites the data on the data bearing endpoint device.

8. The device according to claim 6 where the wiping system overwrites the data on the data bearing endpoint device more than one time.

9. The device according to claim 1 where the data bearing endpoint device is reset.

10. The device according to claim 1 where the mechanism provides secure onsite containment of the processed devices until verification.

11. A system for destroying data on a data bearing endpoint device;
    having a mechanism that receives data bearing endpoint devices, where the data bearing endpoint devices are tagged, has a scanner that scans the tag and stores the information in a database stored in non-transitory memory, has a plurality of compartments, and placing the data bearing endpoint device into the proper compartment, having a wiping system that destroys the data by overwriting the data,
    resetting the data bearing endpoint devices to factory settings as indicated based on post-processing intent, and provides secure onsite containment of the processed devices until verification.

12. The system according to claim 11 where the tags are unique identification tags are unique identification tags are unique radio frequency identification tags or bar codes or PID or active identification tags.

13. The system according to claim 11 where a scanner scans the unique identification tags and stores the information in a database stored in non-transitory memory.

14. The system according to claim 11 where compartments has a plurality of doors and are based on the size and the type of data bearing endpoint device.

15. The system according to claim 14 where one or more compartments have a keypad release door mechanism, a power cable, server connection cable and antitheft wire.

16. The system according to claim 11 having a remote controlled sanitizer.

17. The system according to claim 11 where the wiping system overwrites the data on the data bearing endpoint device one or more times.

18. The system according to claim 11 where the data bearing endpoint device is reset to factory settings based on post-processing intent.

19. The system according to claim 11 which provides secure onsite containment of the processed devices until verification.

20. The system according to claim 11 which uses a scanner to scan the tags of the processed devices and stores the information in a database stored in non-transitory memory for verification.

* * * * *